US007039938B2

(12) United States Patent
Candelore

(10) Patent No.: US 7,039,938 B2
(45) Date of Patent: May 2, 2006

(54) SELECTIVE ENCRYPTION FOR VIDEO ON DEMAND

(75) Inventor: Brant L. Candelore, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 390 days.

(21) Appl. No.: 10/319,133

(22) Filed: Dec. 13, 2002

(65) Prior Publication Data

US 2003/0145329 A1 Jul. 31, 2003

Related U.S. Application Data

(63) Continuation-in-part of application No. 10/273,905, filed on Oct. 18, 2002, and a continuation-in-part of application No. 10/273,903, filed on Oct. 18, 2002, and a continuation-in-part of application No. 10/274,084, filed on Oct. 18, 2002, and a continuation-in-part of application No. 10/274,019, filed on Oct. 18, 2002, and a continuation-in-part of application No. 10/038,217, filed on Jan. 2, 2002, and a continuation-in-part of application No. 10/038,032, filed on Jan. 2, 2002, and a continuation-in-part of application No. 10/037,914, filed on Jan. 2, 2002, and a continuation-in-part of application No. 10/037,499, filed on Jan. 2, 2002, and a continuation-in-part of application No. 10/037,498, filed on Jan. 2, 2002.

(60) Provisional application No. 60/409,675, filed on Sep. 9, 2002, provisional application No. 60/351,771, filed on Jan. 24, 2002.

(51) Int. Cl.
*H04N 7/173* (2006.01)

(52) U.S. Cl. ............................. 725/87; 725/4; 725/92; 725/93; 380/211

(58) Field of Classification Search ................. 725/31, 725/76, 87, 91, 95, 97, 103, 106, 92, 93; 380/200, 210, 216, 217
See application file for complete search history.

(56) References Cited

U.S. PATENT DOCUMENTS 3,852,519 A 12/1974 Court (Continued)

FOREIGN PATENT DOCUMENTS

EP 0471373 2/1992

(Continued)

OTHER PUBLICATIONS

U.S. Appl. No. 10/038,217, filed Jan. 2, 2002, Critical Packet Partial Encryption.

(Continued)

*Primary Examiner*—Kieu-Oanh Bui
(74) *Attorney, Agent, or Firm*—Miller Patent Services; Jerry A. Miller

(57) ABSTRACT

A video on demand (VOD) method, consistent with the invention involves storing multiple selective encrypted VOD content on a VOD server; receiving an order for the VOD content specifying delivery to a target decoder; determining what CA encryption system is associated with the order; stripping all encrypted segments from the multiple selectively encrypted content that are not associated with the order to produce single selectively encrypted VOD content; and sending the single selectively encrypted VOD content to the target decoder. The multiple selectively encrypted VOD content can be created by examining unencrypted data representing digital content to identify segments of content for encryption; encrypting the identified segments of content using a first encryption method associated with a first conditional access system to produce first encrypted segments; encrypting the identified segments of content using a second encryption method associated with a second conditional access system to produce second encrypted segments; and replacing the identified segments of content with the first encrypted content and the second encrypted content in the digital content, to produce the multiple selectively encrypted VOD content.

20 Claims, 4 Drawing Sheets

U.S. PATENT DOCUMENTS

| | | |
|---|---|---|
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,722,003 A | 1/1988 | Kondo |
| 4,739,510 A | 4/1988 | Jeffers et al. |
| 4,772,947 A | 9/1988 | Kono |
| 4,785,361 A | 11/1988 | Brotby |
| 4,788,589 A | 11/1988 | Kondo |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,924,310 A | 5/1990 | von Brandt |
| 4,944,006 A | 7/1990 | Citta et al. |
| 4,953,023 A | 8/1990 | Kondo |
| 4,995,080 A | 2/1991 | Bestler et al. |
| 5,018,197 A | 5/1991 | Jones et al. |
| 5,023,710 A | 6/1991 | Kondo et al. |
| 5,138,659 A | 8/1992 | Kelkar et al. |
| 5,142,537 A | 8/1992 | Kutner et al. |
| 5,144,662 A | 9/1992 | Welmer |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,241,381 A | 8/1993 | Kondo |
| 5,247,575 A | 9/1993 | Sprague et al. |
| 5,258,835 A | 11/1993 | Kato |
| 5,325,432 A | 6/1994 | Gardeck et al. |
| 5,327,502 A | 7/1994 | Katata |
| 5,359,694 A | 10/1994 | Concordel |
| 5,379,072 A | 1/1995 | Kondo |
| 5,398,078 A | 3/1995 | Masuda et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,528,608 A | 6/1996 | Shimizume |
| 5,535,276 A | 7/1996 | Ganesan |
| 5,539,823 A | 7/1996 | Martin |
| 5,539,828 A | 7/1996 | Davis |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,598,214 A | 1/1997 | Kondo et al. |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Eillon et al. |
| 5,663,764 A | 9/1997 | Kondo et al. |
| 5,666,293 A | 9/1997 | Metz et al. |
| 5,703,889 A | 12/1997 | Shimoda et al. |
| 5,717,814 A | 2/1998 | Abecassis |
| 5,732,346 A | 3/1998 | Lazaridis et al. |
| 5,742,680 A | 4/1998 | Wilson |
| 5,742,681 A | 4/1998 | Giachettie et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,757,417 A | 5/1998 | Aras et al. |
| 5,757,909 A | 5/1998 | Park |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasilewski et al. |
| 5,894,320 A | 4/1999 | Vancelette |
| 5,894,516 A | 4/1999 | Brandenburg |
| 5,915,018 A | 6/1999 | Aucsmith |
| 5,922,048 A | 7/1999 | Emura |
| 5,933,500 A | 8/1999 | Blatter et al. |
| 5,940,738 A * | 8/1999 | Rao ........................... 725/103 |
| 5,949,877 A | 9/1999 | Traw et al. |
| 5,949,881 A | 9/1999 | Davis |
| 5,973,679 A | 10/1999 | Abbott et al. |
| 5,973,722 A * | 10/1999 | Wakai et al. ................. 725/76 |
| 5,999,622 A | 12/1999 | Yasukawa et al. |
| 5,999,698 A | 12/1999 | Nakai et al. |
| 6,005,561 A | 12/1999 | Hawkins et al. |
| 6,011,849 A | 1/2000 | Orrin |
| 6,012,144 A | 1/2000 | Pickett |
| 6,021,199 A | 2/2000 | Ishibashi |
| 6,021,201 A | 2/2000 | Bakhle et al. |
| 6,028,932 A | 2/2000 | Park |
| 6,049,613 A | 4/2000 | Jakobsson |
| 6,055,314 A | 4/2000 | Spies et al. |
| 6,057,872 A | 5/2000 | Candelore |
| 6,058,186 A | 5/2000 | Enari |
| 6,058,192 A | 5/2000 | Guralnick et al. |
| 6,061,451 A | 5/2000 | Muratani et al. |
| 6,064,748 A | 5/2000 | Hogan |
| 6,065,050 A | 5/2000 | DeMoney |
| 6,069,647 A | 5/2000 | Sullivan et al. |
| 6,072,873 A | 6/2000 | Bewick |
| 6,073,122 A | 6/2000 | Wool |
| 6,088,450 A | 7/2000 | Davis et al. |
| 6,105,134 A | 8/2000 | Pinder et al. |
| 6,118,873 A | 9/2000 | Lotspiech et al. |
| 6,134,551 A | 10/2000 | Aucsmith |
| 6,138,237 A | 10/2000 | Ruben et al. |
| 6,154,206 A | 11/2000 | Ludtke |
| 6,157,719 A | 12/2000 | Wasilewski et al. |
| 6,181,334 B1 | 1/2001 | Freeman et al. |
| 6,185,369 B1 | 2/2001 | Ko et al. |
| 6,185,546 B1 | 2/2001 | Davis |
| 6,189,096 B1 | 2/2001 | Haverty |
| 6,192,131 B1 | 2/2001 | Geer et al. |
| 6,199,053 B1 | 3/2001 | Herbert et al. |
| 6,204,843 B1 | 3/2001 | Freeman et al. |
| 6,209,098 B1 | 3/2001 | Davis |
| 6,215,484 B1 | 4/2001 | Freeman et al. |

| | | |
|---|---|---|
| 6,226,618 B1 | 5/2001 | Downs |
| 6,229,895 B1 | 5/2001 | Son et al. |
| 6,230,194 B1 | 5/2001 | Frailong et al. |
| 6,230,266 B1 | 5/2001 | Perlman et al. |
| 6,240,553 B1 | 5/2001 | Son et al. |
| 6,256,747 B1 | 7/2001 | Inohara et al. |
| 6,263,506 B1 | 7/2001 | Ezaki et al. |
| 6,266,416 B1 | 7/2001 | Sigbjornsen et al. |
| 6,266,480 B1 | 7/2001 | Ezaki et al. |
| 6,272,538 B1 | 8/2001 | Holden et al. |
| 6,278,783 B1 | 8/2001 | Kocher et al. |
| 6,289,455 B1 | 9/2001 | Kocher et al. |
| 6,292,568 B1 | 9/2001 | Akins, III et al. |
| 6,292,892 B1 | 9/2001 | Davis |
| 6,307,939 B1 | 10/2001 | Vigarie |
| 6,311,012 B1 | 10/2001 | Cho et al. |
| 6,351,538 B1 | 2/2002 | Uz |
| 6,378,130 B1 | 4/2002 | Adams |
| 6,389,533 B1 | 5/2002 | Davis et al. |
| 6,389,537 B1 | 5/2002 | Davis et al. |
| 6,415,031 B1* | 7/2002 | Colligan et al. ............ 380/200 |
| 6,415,101 B1 | 7/2002 | deCarmo et al. |
| 6,430,361 B1 | 8/2002 | Lee |
| 6,449,718 B1 | 9/2002 | Rucklidge et al. |
| 6,456,985 B1 | 9/2002 | Ohtsuka |
| 6,459,427 B1 | 10/2002 | Mao et al. |
| 6,463,152 B1 | 10/2002 | Takahashi |
| 6,466,671 B1 | 10/2002 | Maillard et al. |
| 6,505,032 B1 | 1/2003 | McCorkle et al. |
| 6,510,554 B1 | 1/2003 | Gordon et al. |
| 6,519,693 B1 | 2/2003 | Debey |
| 6,529,526 B1 | 3/2003 | Schneidewend |
| 6,543,053 B1 | 4/2003 | Li et al. |
| 6,549,229 B1 | 4/2003 | Kirby et al. |
| 6,557,031 B1 | 4/2003 | Mimura et al. |
| 6,587,561 B1 | 7/2003 | Sered et al. |
| 6,640,145 B1 | 10/2003 | Hoffberg et al. |
| 6,654,389 B1 | 11/2003 | Brunheroto et al. |
| 6,678,740 B1 | 1/2004 | Rakib et al. |
| 6,681,326 B1 | 1/2004 | Son et al. |
| 6,697,944 B1 | 2/2004 | Jones et al. |
| 6,772,340 B1 | 8/2004 | Peinado et al. |
| 6,904,520 B1 | 6/2005 | Rosset et al. |
| 2002/0046406 A1 | 4/2002 | Chelehmal et al. |
| 2002/0059425 A1 | 5/2002 | Belfiore et al. |
| 2002/0083438 A1* | 6/2002 | So et al. ........................ 725/31 |
| 2002/0108035 A1 | 8/2002 | Herley et al. |
| 2002/0129243 A1 | 9/2002 | Nanjundiah |
| 2002/0150239 A1 | 10/2002 | Carny et al. |
| 2002/0170053 A1 | 11/2002 | Peterka et al. |
| 2002/0194613 A1 | 12/2002 | Unger |
| 2002/0196939 A1 | 12/2002 | Unger et al. |
| 2003/0021412 A1 | 1/2003 | Candelore et al. |
| 2003/0026423 A1 | 2/2003 | Unger et al. |
| 2003/0046686 A1 | 3/2003 | Candelore et al. |
| 2003/0063615 A1 | 4/2003 | Luoma et al. |
| 2003/0081630 A1 | 5/2003 | Mowery et al. |
| 2003/0081776 A1 | 5/2003 | Candelore |
| 2003/0097662 A1 | 5/2003 | Russ et al. |
| 2003/0123664 A1 | 7/2003 | Pedlow et al. |
| 2003/0123849 A1 | 7/2003 | Nallur et al. |
| 2003/0133570 A1 | 7/2003 | Candelore et al. |
| 2003/0145329 A1 | 7/2003 | Candelore |
| 2003/0152224 A1 | 8/2003 | Candelore et al. |
| 2003/0152226 A1 | 8/2003 | Candelore et al. |
| 2003/0156718 A1 | 8/2003 | Candelore et al. |
| 2003/0159139 A1 | 8/2003 | Candelore et al. |
| 2003/0159140 A1 | 8/2003 | Candelore |
| 2003/0159152 A1 | 8/2003 | Lin et al. |
| 2003/0174837 A1 | 9/2003 | Candelore et al. |
| 2003/0198223 A1 | 10/2003 | Mack et al. |
| 2003/0226149 A1 | 12/2003 | Chun et al. |
| 2004/0003008 A1 | 1/2004 | Wasilewski et al. |
| 2004/0047470 A1 | 3/2004 | Candelore |
| 2004/0049688 A1 | 3/2004 | Candelore et al. |
| 2004/0049690 A1 | 3/2004 | Candelore et al. |
| 2004/0049691 A1 | 3/2004 | Candelore et al. |
| 2004/0049694 A1 | 3/2004 | Candelore |
| 2004/0078575 A1 | 4/2004 | Morten et al. |
| 2004/0123094 A1 | 6/2004 | Sprunk |
| 2004/0139337 A1 | 7/2004 | Pinder et al. |
| 2004/0165586 A1 | 8/2004 | Read et al. |
| 2004/0187161 A1 | 9/2004 | Cao |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0674441 | 9/1995 |
| EP | 0833517 | 4/1998 |
| EP | 0866615 | 9/1998 |
| EP | 1 187 483 A2 | 3/2002 |
| EP | 1187483 | 3/2002 |
| JP | 7067028 | 3/1995 |
| JP | 11243534 | 10/2002 |
| WO | WO 86/07224 | 12/1986 |
| WO | WO 94/10775 | 5/1994 |
| WO | 0674440 | 9/1995 |
| WO | WO 97/38530 | 10/1997 |
| WO | WO 00/31964 | 6/2000 |
| WO | WO 01/78386 | 10/2001 |
| WO | WO 01/78386 A2 | 10/2001 |

OTHER PUBLICATIONS

U.S. Appl. No. 10/038,032, filed Jan. 2, 2002, Time Division Partial Encryption.

U.S. Appl. No. 10/037,914, filed Jan. 2, 2002, Elementary Stream Partial Encryption.

U.S. Appl. No. 10/037,499, filed Jan. 2, 2002, Partial Encryption and PID Mapping.

U.S. Appl. No. 10/037,498, filed Jan. 2, 2002, Decoding and Decryption of Partially Encrypted Information.

U.S. Appl. No. 10/273,905, filed Oct. 18, 2002, Video Slice and Active Region Based Dual Partial Encryption.

U.S. Appl. No. 10/319,133, filed Dec. 13, 2002, Selective Encryption for Video on Demand.

U.S. Appl. No. 10/273,875, filed Oct. 18, 2002, Encryption and Content Control in Digital Broadcast System.

U.S. Appl. No. 10/084,106, filed Feb. 27, 2002, Reconstitution of Program Streams Split Across Multiple Program Identifiers.

U.S. Appl. No. 10/273,903, filed Oct. 18, 2002, Star Pattern Partial Encryption.

U.S. Appl. No. 10/274,084, filed Oct. 18, 2002, Slice Mask and Moat Pattern Partial Encryption.

U.S. Appl. No. 10/319,066, filed Dec. 13, 2002, Content Replacement by PID Mapping.

U.S. Appl. No. 10/293,761, filed Nov. 13, 2002, Upgrading of Encryption.

U.S. Appl. No. 10/318,782, filed Dec.13, 2002, Content Distribution for Multiple Digital Rights Management.

U.S. Appl. No. 10/319,169, filed Dec. 13, 2002, Selective Encryption to Enable Multiple Decryption Keys.

U.S. Appl. No. 10/273,904, filed Oct. 18, 2002, Multiple Partial Encryption Using Retuning.

U.S. Appl. No. 10/319,096, filed Dec. 13, 2002, Selective Encryption to Enable Trick Play.

U.S. Appl. No. 10/391,940, filed Mar. 19, 2003, Selective Encryption to Enabled Trick Play.

U.S. Appl. No. 10/303,594, filed Nov. 25, 2002, Progressive Video Refresh Slice Detection.
U.S. Appl. No. 10/274,019, filed Oct. 18, 2002, Video Scene Change Detection.
U.S. Appl. No. 10/393,324, filed Mar. 20, 2003, Auxiliary Program Association Table.
U.S. Appl. No. 10/373,479, filed Feb. 24, 2003, PID Filter Based Network Routing.
U.S. Appl. No. 10/767,421, filed Jan. 29, 2004, Content Scrambling With Minimal Impact on Legacy Devices.
U.S. Appl. No. 10/662,585, filed Sep. 15, 2003, Decryption System.
U.S. Appl. No. 10/667,614, filed Sep. 22, 2003, Modifying Content Rating.
U.S. Appl. No. 10/634,546, filed Aug. 5, 2003, Variable Perspective View of Video Images.
U.S. Appl. No. 10/822,891, filed Apr. 13, 2004, Macro-Block Based Content Replacement by PID Mapping.
U.S. Appl. No. 10/764,202, filed Jan. 23, 2004, Re-Encrypted Delivery of Video On Demand Content.
U.S. Appl. No. 10/828,737, filed Apr. 21, 2004, Batch Mode Session-based Encryption of Video on Demand Content.
U.S. Appl. No. 10/764,011, filed Jan. 23, 2004, Bi-Directional Indices for Trick Mode Video-on-Demand.
U.S. Appl. No. 10/802,084, filed Mar. 16, 2004, Hybrid Storage of Video on Demand Content.
U.S. Appl. No. 10/802,007, filed Mar. 16, 2004, Dynamic Composition of Pre-Encrypted Video on Demand Content.
U.S. Appl. No. 10/774,871, filed Feb. 9, 2004, Cablecard with Content Manipulation.
U.S. Appl. No. 10/802,008, filed Mar. 16, 2004, Preparation of Content for Multiple Conditional Access Methods in Video on Demand.
U.S. Appl. No. 10/823, 431, filed Apr. 13, 2004, Composite Session-Based Encryption of Video on Demand.
U.S. Appl. No. 10/964,267, filed Oct. 13, 2004, Multiple Selective Encryption with DRM.
U.S. Appl. No. 10/763,865, filed Jan. 22, 2004, Method And Apparatus For Securing Control Words.
U.S. Appl. No. 10/387,163, filed Mar. 22, 2003, Method and Apparatus for Protecting the Transfer of Data.
U.S. Appl. No. 10/815,371, filed Mar. 31, 2004, IP Delivery of Secure Digital Content.
U.S. Appl. No. 10/764,682, filed Jan. 23, 2004, System, Method and Apparatus for Secure Digital Content Transmission.
U.S. Appl. No. 10/388,002, filed Mar. 12, 2003, Mechanism for Protecting the Transfer of Digital Content.
U.S. Appl. No. 10/690,192, filed Mar. 12, 2003, Descrambler.
U.S. Appl. No. 10/691,170, filed Oct. 5, 2003, Multi-Process.
U.S. Appl. No. 10/403,834, filed Mar. 31, 2003, System and Method for Partially Encrypted Multimedia System.
"A Report on Security Issues in Multimedia" by Gulwani, pp. 10-14, Apr. 30, 2000, Course Notes, Department of Computer Science and Engineering, Indian Institute of Technology Kanpur.
"Ad Agencies and Advertisers To Be Empowered with Targeted Ads Delivered by Television's Prevailing Video Servers" Article Business Section of The New York Times, Updated Thursday, Dec. 20, 2001.
"An Efficient MPEG Video Encryption Algorithm" by Shi and Bhargava, pp. 381-386, 1998 IEEE.
"An Empirical Study of Secure MPEG Video Transmission" by Agi and Gong, pp. 137-144, 1996, IEEE, Proceedings of SNDSS '96.
"Applying Encryption to Video Communication" by Kunkelmann, pp. 41-47, Sep., 1998, Multimedia and Security Workshop at ACM Multimedia '98. Bristol, U.K.
"Comparison of MPEG Encryption Algorithms" by Qiao and Nahrstedt, Jan. 17, 1998, Preprint submitted to Elsevier Science.
"Coral Consortium Aims to Make DRM Interoperable", by Bill Rosenblatt, Oct. 7, 2004, online at http://www.drmwatch.com/standards/article.php/3418741.
"DVD Demystified—The Guidebook for DVD-Video and DVD-ROM" by Jim Taylor, Pub. McGraw-Hill, 1998, ISBN: 0-07-064841-7, pp. 134-147.
"Dynamic-Customized TV Advertising Creation and Production Tools" by SeaChange International, Web Site Literature.
"Efficient Frequency Domain Video Scrambling for Content Access Control" by Zeng and Lei, Nov. 1999, In Proc. ACM Multimedia.
"Evaluation of Selective Encryption Techniques for Secure Transmission of MPEG-Compressed Bit-Streams" by Alattar and Al-Regib, pp. IV-340 to IV-343, 1999, IEEE.
"Fast Encryption Methods for Audiovisual Data Confidentiality" by Wu and Kuo, Nov. 2000, SPIE International Symposia on Information Technologies 2000, (Boston, Ma., USA).
"Improved Selective Encryption Techniques for Secure Transmission of MPEG Video Bit-Streams" by Alattar, Al-Regib and Al-Semari, pp. 256-260, 1999, IEEE.
Metro Media™ PVR-DVD-MP3-Web—Internet publication from www. metrolink.com, undated.
"Multimedia and Security Workshop at ACM Multimedia" '98. Bristol, U.K., Sep. 1998.
"Passage™, Freedom to Choose", 2003, Sony Electronics Inc.
"Performance Study of a Selective Encryption Scheme for the Security of Networked, Real-Time Video" by Spanos and Maples, pp. 2-10, 1995, IEEE.
"Pre-Encryption Profiles—Concept Overview and Proposal", Rev. 1.2 as submitted to the Open CAS consortium on Dec. 28, 2000.
"Run-Time Performance Evaluation for a Secure MPEG System Supporting Both Selective Watermaking and Encryption" by Wu and Wu, Mar. 1, 1997, submitted to JSAC special issue on Copyright and Privacy Protection.
"Selective Encryption and Watermaking of MPEG Video (Extended Abstract)" by Wu and Wu, Feb. 17, 1997, submitted to International Conference on Image Science, Systems, and Technology, CISST'97.
"The Long March to Interoperable Digital Rights Management" by Koenen et al., pp. 1-17, 2004, IEEE.
"Transport Streams Insertion of Video in the Compressed Digital Domain" by SeaChange International, Web Site Literature, 2000.
"Visible World—A High Impact Approach to Customized Television Advertising" by Haberman, Dec. 2001.
ANONYMOUS, Message Authentication with Partial Encryption, Research discosure RD 296086, Dec. 10, 1998.
ANONYMOUS, New Digital Copy Protection Proposal Would Secure Authorized Copie, PR Newswire, Nov. 1998, pp. 1-3.
Aravind, H.., et al., "Image and Video Coding Standards", AT&T Technical Journal, (Jan./Feb. 1993),67-68.

Gonzales, R. C., et al., "Digital Image Processing", Addison Wesley Publishing Company, Inc., (1992),346-348.

Kim, et al., "Bit Rate Reduction Algorithm for a Digital VCR", IEEE Transactions on Consumer Electronics, vol. 37, No. 3, (Aug. 1, 1992),267-274.

Kondo, et al., "A New Concealment Method for Digital VCRs", IEEE Visual Signal Processing and Communication, Melbourne, Australia,(Sep. 1993),20-22.

Kondo, et al., "Adaptive Dynamic Range Coding Scheme for Future Consumer Digital VTR", 219-226.

Kondo, et al., "Adaptive Dynamic Range Coding Scheme for Future HDTV Digital VTR", Sony Corporation, (1991).

Lakshiminath, et al., "A Dual Protocol for Scalable Secure Multicasting", 1999 International Symposium on Computers and Communication, Jul. 6-8, 1999.

Lookabaugh et al., "Selective Encryption and MPEG-2", ACM Multimedia '03, Nov. 2003.

Menezes, Alfred J., et al., "Handbook of Applied Cryptography", CRC Press, 551-553.

NHK Laboratories Note, "Error Correction, Concealment and Shuffling", No. 424, (Mar. 1994),29-44.

Park, et al., "A Simple Concealment for ATM Bursty Cell Loss", IEEE Transactions on Consumer Electronics, No. 3, (Aug. 1993),704-709.

Robert et al., "Digital Cable: The Key to Your Content", Access Intelligence's Cable Group, Feb. 2002, online at http:www.cableworld.com/ct/archives/0202/0202digitalrights.htm.

Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.

Zhu, et al., "Coding and Cell-Loss Recovery in DCT-Based Packet Video", IEEE Transactions on Circuits and Systems for Video Technology, No. 3, NY,(Jun. 3, 1993).

"ClearPlay: The Technology of Choice", from web site, ClearPlay 2001-2003.

ANONYMOUS, New Digital Copy Protection Proposal Would Secure Authorized Copies, PR Newswire, Nov. 1998, pp. 1-3.

ANONYMOUS, Message Authentication with Partial Encryption, Research disclosure RD 296086, Dec. 10, 1988.

"Performance Study of a Selective Encryption Scheme for the Security of Networked, Real-Time Video" by Spanos and Maples, pp. 2-10, 1995, IEEE.

"An Empirical Study of Secure MPEG Video Transmissions" by Agi and Gong, pp. 137-144, 1996, IEEE, Proceedings of SNDSS '96.

"Selective Encryption and Watermarking of MPEG Video (Extended Abstract)" by Wu and Wu, Feb. 17, 1997, submitted to International Conference on Image Science, Systems, and Technology, CISST'97.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.

"DVD Demystified—The Guidebook for DVD-Video and DVD-ROM" by Jim Taylor, Pub. McGraw-Hill, 1998, ISBN: 0-07-064841-7, pp. 134-147.

"An Efficient MPEG Video Encryption Algorithm" by Shi and Bhargava, pp. 381-386, 1998 IEEE.

"Multimedia and Security Workshop at ACM Multimedia" '98. Bristol, U.K., Sep. 1998.

"Comparison of MPEG Encryption Algorithms" by Qiao and Nahrstedt, Jan. 17, 1998, Preprint submitted to Elsevier Science.

"Applying Encryption to Video Communication" by Kunkelmann, pp. 41-47, Sep. , 1998, Multimedia and Security Workshop at ACM Multimedia '98. Bristol, U.K.

"Evaluation of Selective Encryption Techniques for Secure Transmission of MPEG-Compressed Bit-Streams" by Alattar and Al-Regib, pp. IV-340 to IV-343, 1999, IEEE.

"Improved Selective Encryption Techniques for Secure Transmission of MPEG Video Bit-Streams" by Alattar, Al-Regib and Al-Semari, pp. 256-260, 1999, IEEE.

"Efficient Frequency Domain Video Scrambling for Content Access Control" by Zeng and Lei, Nov. 1999, In Proc. ACM Multimedia.

"Transport Streams Insertion of Video in the Compressed Digital Domain" by SeaChange International, Web Site Literature, 2000.

"A Report on Security Issues in Multimedia" by Gulwani, Apr. 30, 2000, Course Notes, Department of Computer Science and Engineering, Indian Institute of Technology Kanpur.

"Fast Encryption Methods for Audiovisual Data Confidentiality" by Wu and Kuo, Nov. 2000, SPIE International Symposia on Information Technologies 2000, (Boston, Ma., USA).

"Visible World—A High Impact Approach to Customized Television Advertising" by Haberman, Dec. 2001.

"Ad Agencies and Advertisers To Be Empowered with Targeted Ads Delivered by Television's Prevailing Video Servers" Article Business Section of The New York Times, Updated Thursday, Dec. 20, 2001.

"Pre-Encryption Profiles—Concept Overview and Proposal", Rev. 1.2 as submitted to the Open CAS consortium on Dec. 28, 2000.

"Dynamic-Customized TV Advertising Creation and Production Tools" by SeaChange International, Web Site Literature.

Alattar, A.M. et al., Improved selective encryption techniques for secure transmission of MPEG video bitstreams, Oct. 24, 1999, Digimarc Corp., Lake Oswego, OR, USA, IEEE, pp. 256-260.

Kunkelmann T. et al., A scalable security architecture for multimedia communication standards, Darmstard Univ. of Technology, ITO, Germany, 1997, pp. 660-661.

Yip, Kun-Wah, Partial-encryption technique for intellectual property protection of FPGA-Based products, Dec. 15, 1999, IEEE, pp. 183-190.

International Search Report for application No. PCT/US2004/032228.

Liu, et al. Motion Vector Encryption in Multimedia Streaming, 2004, IEEE, pp. 64-71.

* cited by examiner

SELECTIVE ENCRYPTION FOR VIDEO ON DEMAND

CROSS REFERENCE TO RELATED DOCUMENTS

This application is a continuation-in-part of patent applications entitled "Critical Packet Partial Encryption" to Unger et al., Ser. No. 10/038,217 filed Jan. 2, 2002; patent applications entitled "Time Division Partial Encryption" to Candelore et al., Ser. No. 10/038,032 filed Jan. 2, 2002; entitled "Elementary Stream Partial Encryption" to Candelore, Ser. No. 10/037,914 filed Jan. 2, 2002; entitled "Partial Encryption and PID Mapping" to Unger et al., Ser. No. 10/037,499 filed Jan. 2, 2002; and entitled "Decoding and Decrypting of Partially Encrypted Information" to Unger et al., Ser. No. 10/037,498 all of which were filed on Jan. 2, 2002 and are hereby incorporated by reference herein.

This application is also a continuation-in-part of U.S. patent applications Ser. No. 10/273,905, filed Oct. 18, 2002 to Candelore et al., entitled "Video Slice and Active Region Based Dual Partial Encryption", Ser. No. 10/273,903, filed Oct. 18, 2002 to Candelore et al., entitled "Star Pattern Partial Encryption", Ser. No. 10/274,084, filed Oct. 18, 2002 to Candelore et al., entitled "Slice Mask and Moat Pattern Partial Encryption", and Ser. No. 10/274,019, filed Oct. 18, 2002 to Candelore et al., entitled "Video Scene Change Detection", which are hereby incorporated by reference.

This application is also related to and claims priority benefit of U.S. Provisional patent application Ser. No. 60/409,675, filed Sep. 9, 2002, entitled "Generic PID Remapping for Content Replacement", to Candelore and U.S. Provisional Application Ser. No. 60/351,771, filed Jan. 24, 2002, entitled "Method for Allowing Multiple CA Providers to Interoperate in a VOD Delivery System and Content Delivered on Package Media" to Candelore. These applications are also hereby incorporated by reference herein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of video on demand (VOD). More particularly, this invention relates to a multiple encryption method and apparatus particularly useful for multiple encrypting digitized video on demand programming.

BACKGROUND OF THE INVENTION

Video On Demand (VOD) is becoming a service which cable operators now consider to be a mandatory service as much as subscription and impulse pay-per-view (IPPV). But, VOD is different from broadcast services in that content is statically stored on VOD servers (often at the cable hubs), and is delivered to a specific subscriber upon receipt of a specific request by that subscriber.

VOD servers are often located at cable hub facilities. Hubs are located out in the local neighborhoods and serve a subset of perhaps about 80,000 subscribers. By locating the VOD system at the hub level, use of bandwidth is more efficient since customers in different hubs can use the same spectrum. As a point of contrast, subscription and IPPV content is generally scrambled at a Master Headend and delivered to the hubs for distribution.

There are currently two major VOD service providers in the cable industry. In one, content is stored pre-encrypted on hard drives in the VOD server. The keys used to encrypt the content do not change from month-to-month, however, the entitlement control messages (ECMs) used to derive those keys to enable the conditional access (CA) system are updated every month. In the second VOD system, content is stored in-the-clear on hard drives in the VOD server. The content is encrypted real-time with slow changing keys (lasting 20 minutes or more). For other systems, the VOD content is sent in-the-clear to subscribers. Storage has been typically in-the-clear or encrypted using a simple "storage key".

The frequency and program identifiers (PIDs) used for a VOD session are privately signaled through encrypted transactions, so that someone trying to eavesdrop on the VOD communication cannot receive the tuning information for the program even if the content is sent in-the-clear. In some systems, the content is scrambled as an IPPV program. The program is therefore "purchased" as in a broadcast IPPV program. If an eavesdropper could locate the VOD channel, he or she would still need to pay for the movie as the legitimate customer.

In addition to the security provided by encryption, encryption of PIDs and frequencies and other measures, VOD security also relies on the fact that both the content and viewing times are under control of a legitimate purchasing party. That party can pause the program for a half an hour or all day. The content can be "rewound" or started over from scratch. These factors all contribute to providing protection against pirating of the content.

For all of the differences between VOD programming and conventional programming for cable and satellite programming, there remains a significant problem when a cable or satellite operator wishes to utilize decoder equipment (e.g., television set top boxes (STBs)) from multiple vendors. As with conventional cable television, each vendor generally uses its own conditional access (CA) encryption system. If a multiple service operator (MSO) chooses to utilize mulitple STBs in a system, it must somehow accommodate multiple CA systems. This problem has been discussed extensively in the above-referenced patent applications. Since VOD content storage is limited, duplicating content so that it may be available to both legacy and non-legacy CAs may not be a practical (because of a lack of rack space), or economical (storage costs money).

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
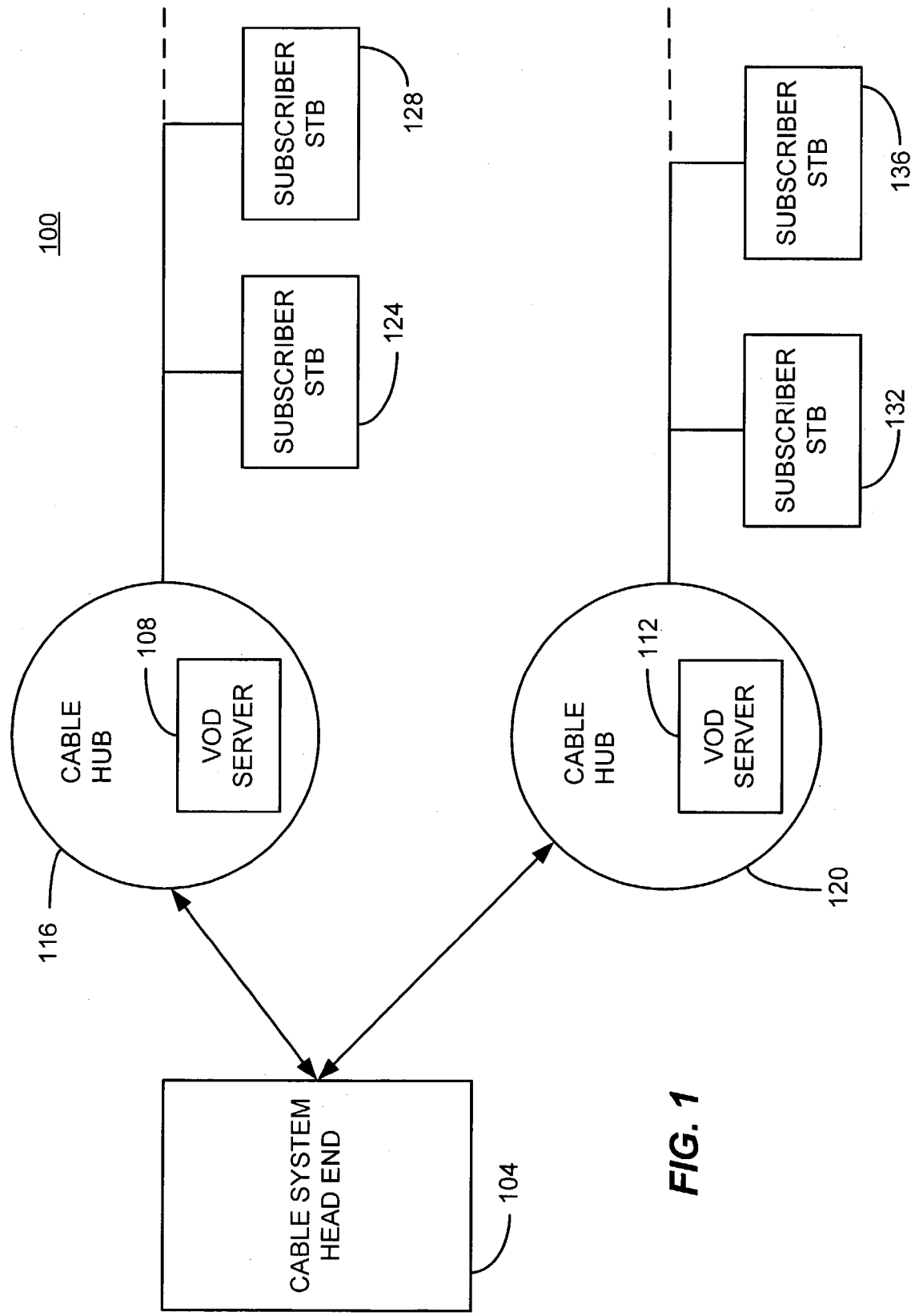
FIG. 1 is a block diagram of an exemplary video on demand cable television system consistent with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The terms "scramble" and "encrypt" and variations thereof are used synonymously herein. The term "video" may be used herein to embrace not only true visual information, but also in the conversational sense (e.g., "video tape recorder") to embrace not only video signals but associated audio and data. The present document generally uses the example of a "dual selective encryption" embodiment, but those skilled in the art will recognize that the present invention can be utilized to realize multiple partial encryption without departing from the invention. The terms "partial encryption" and "selective encryption" are used synonymously herein. Also, the terms "program" and "television program" and similar terms can be interpreted in the normal conversational sense, as well as a meaning wherein the term means any segment of A/V content that can be displayed on a television set or similar monitor device. The term "legacy" as used herein refers to existing technology used for existing cable and satellite systems. The exemplary embodiments disclosed herein are decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself. The present document generally uses the example of a "dual partial encryption" embodiment, but those skilled in the art will recognize that the present invention can be utilized to realize multiple partial encryption without departing from the invention.

The above-referenced commonly owned patent applications describe inventions relating to various aspects of methods generally referred to herein as partial encryption or selective encryption. More particularly, systems are described wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is needed to effectively encrypt the content using multiple encryption systems. This results in a cable or satellite system being able to utilize Set-top boxes or other implementations of conditional access (CA) receivers from multiple manufacturers in a single system—thus freeing the cable or satellite company to competitively shop for providers of Set-top boxes.

The present invention applies similar selective encryption techniques to the problem of multiple VOD encryption systems. The partial encryption processes described in the above patent applications utilize any suitable encryption method. However, these encryption techniques are selectively applied to the data stream, rather than encrypting the entire data stream, using techniques described in the above-referenced patent applications. In general, but without the intent to be limiting, the selective encryption process utilizes intelligent selection of information to encrypt so that the entire program does not have to undergo dual encryption. By appropriate selection of data to encrypt, the program material can be effectively scrambled and hidden from those who desire to hack into the system and illegally recover commercial content without paying. MPEG (or similar format) data that are used to represent the audio and video data does sousing a high degree of reliance on the redundancy of information from frame to frame. Certain data can be transmitted as "anchor" data representing chrominance and luminance data. That data is then often simply moved about the screen to generate subsequent frames by sending motion vectors that describe the movement of the block. Changes in the chrominance and luminance data are also encoded as changes rather than a recoding of absolute anchor data. Thus, encryption of this anchor data, for example, or other key data can effectively render the video un-viewable.

In accordance with certain embodiments consistent with the present invention, the selected video data to be encrypted may be any individual one or combination of the following (described in greater detail in the above applications): video slice headers appearing in an active region of a video frame, data representing an active region of a video frame, data in a star pattern within the video frame, data representing scene changes, I Frame packets, packets containing motion vectors in a first P frame following an I Frame, packets having an intra_slice_flag indicator set, packets having an intra_slice indicator set, packets containing an intra_coded macroblock, data for a slice containing an intra_coded macroblock, data from a first macroblock following the video slice header, packets containing video slice headers, anchor data, and P Frame data for progressively refreshed video data, data arranged in vertical and or horizontal moat patterns on the video frame, and any other selected data that renders the video and/or audio difficult to utilize. Several such techniques as well as others are disclosed in the above-referenced patent applications, any of which (or other techniques) can be utilized with the present invention to encrypt only a portion of the content.

Referring now to FIG. 1, a VOD content delivery system 100 consistent with certain embodiments of the present invention is illustrated. In this system, a cable television multiple services operator (MSO) operates a cable head end 104 to provide content to subscribers. VOD content is statically stored on VOD servers such as servers 108 and 112 depicted as located at cable hubs 116 and 120 respectively. The VOD content is delivered to a specific subscriber's STB such as STB 124, 128, 132 or 136 upon receipt of a specific request by that subscriber.

In accordance with certain embodiments consistent with the present invention, content stored in the VOD servers is delivered to the ordering STB which has an individual identification code that can be addressed by the cable head end and VOD server. Because VOD is interactive, the cable system can learn not only the address of the ordering STB, but also what type of STB the ordering STB is (e.g., a legacy or non-legacy set-top box), and what CA system the STB uses.

Using selective encryption for subscription and IPPV broadcast services as described in the above-referenced patent applications, cable operators can manage content in real-time—received and decrypted off HITS satellites, and then selectively re-encrypted for the legacy and non-legacy conditional access (CA) providers operating in the cable plant. Such selective encryption entails duplicating and encrypting certain important or critical segments of the content independently with each CA while sending the remainder of the content in the clear. The clear content can be received by both legacy and non-legacy set-top boxes, affording a huge savings in bandwidth from the "full dual carriage" approach, while the encrypted content is decrypted by the respective set-top boxes with the particular CA.

Figure 2:
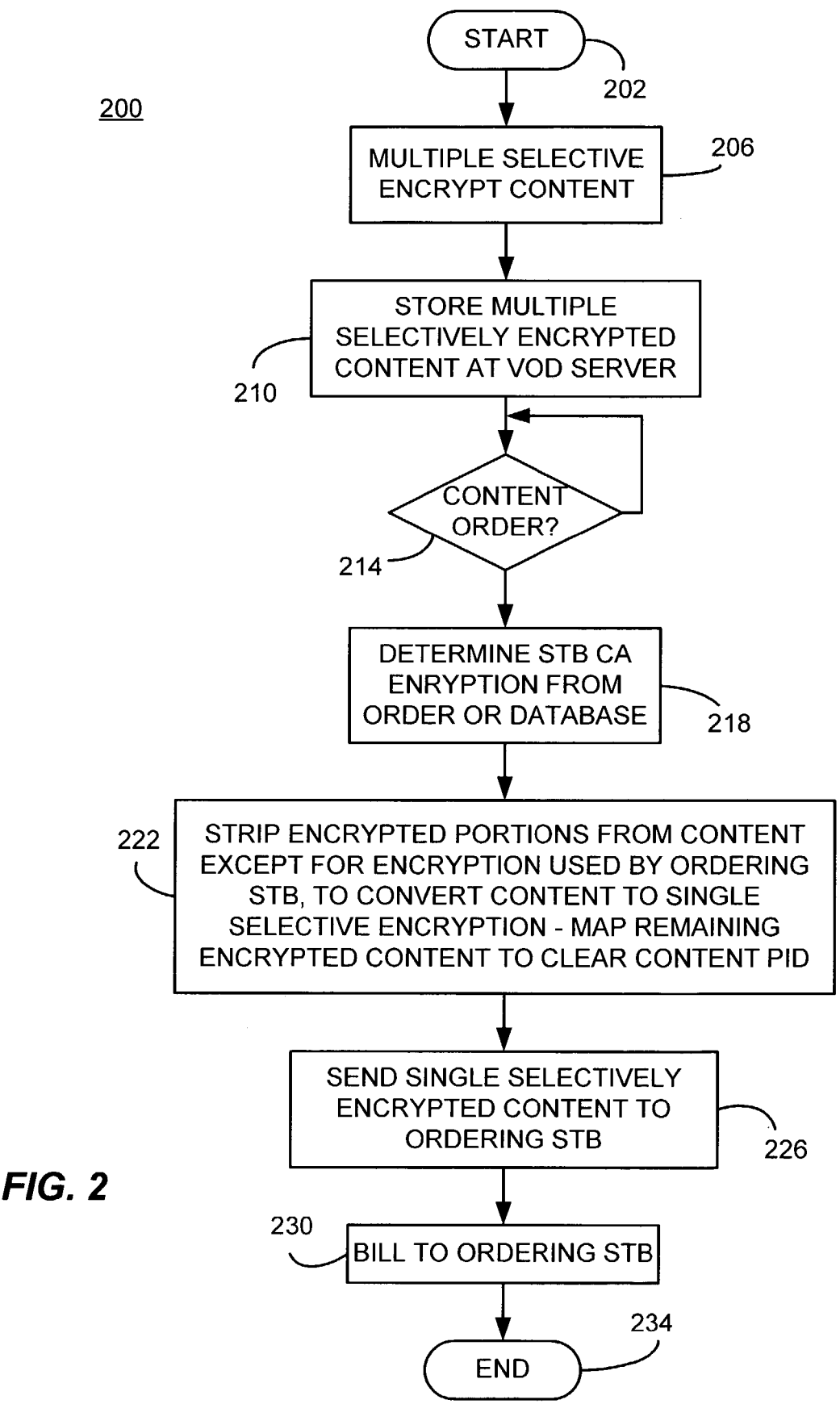
FIG. 2 is a flow chart depicting operation of an exemplary embodiment consistent with certain embodiments of the present invention.

In VOD systems, since the content is directed to a specific target STB (the ordering STB), the efficiency of both transmission and storage of the content can be enhanced using multiple and single selective encryption in accordance with embodiments consistent with the present invention. FIG. 2 depicts a process 200 consistent with an embodiment of the present invention starting at 202 in which the VOD content is stored as a multiple (e.g., dual) selectively encrypted content and then transmitted as single selectively encrypted content. At 206, the content is selectively multiply encrypted. This is carried out by selecting appropriate segments of content to be encrypted that are important or critical to the decoding of the content, duplicating those selected segments content and encrypting each copy using a different encryption method (one for each CA system in use). The resulting multiple selectively encrypted content is then stored on the VOD server(s) or at a data repository in the cable head end. Of course, those skilled in the art will understand that any time critical PCR information should be fixed along with the Continuity Counter information in the duplicated packets.

When VOD content is ordered by a subscriber at 214, the cable system (e.g., using registration information stored at the cable head end for each STB) determines what type of STB is associated with the order and thus what type of CA encryption system is being used by the ordering STB at 218. Once this is determined, there is no need to transmit the multiple selectively encrypted content to the subscriber (unless the order somehow is to be associated with multiple STBs of different types as in a household having two different STBs, both of which are to be entitled to decode the content). Thus, the encrypted portions of the content that are encrypted under a CA encryption not used by the ordering STB are stripped out at 222 to convert the multiple selectively encrypted VOD content into single selectively encrypted VOD content. The remaining encrypted content is then associated with the program identifier used by the clear unencrypted content to produce the single selectively encrypted VOD content. This single selectively encrypted VOD content is then provided to the ordering STB at 226. As a result of the order of the VOD content, a bill is ultimately sent to the subscriber at 230 for the VOD content and the process ends at 234.

Thus, in accordance with certain embodiments consistent with the present invention, a video on demand (VOD) method, involves storing multiple selective encrypted VOD content on a VOD server; receiving an order for the VOD content specifying delivery to a target decoder; determining what CA encryption system is associated with the order; stripping all encrypted segments from the multiple selectively encrypted content that are not associated with the order to produce single selectively encrypted VOD content; and sending the single selectively encrypted VOD content to the target decoder. The multiple selectively encrypted VOD content can be created by examining unencrypted data representing digital content to identify segments of content for encryption; encrypting the identified segments of content using a first encryption method associated with a first conditional access system to produce first encrypted segments; encrypting the identified segments of content using a second encryption method associated with a second conditional access system to produce second encrypted segments; and replacing the identified segments of content with the first encrypted content and the second encrypted content in the digital content, to produce the multiple selectively encrypted VOD content.

Figure 3:
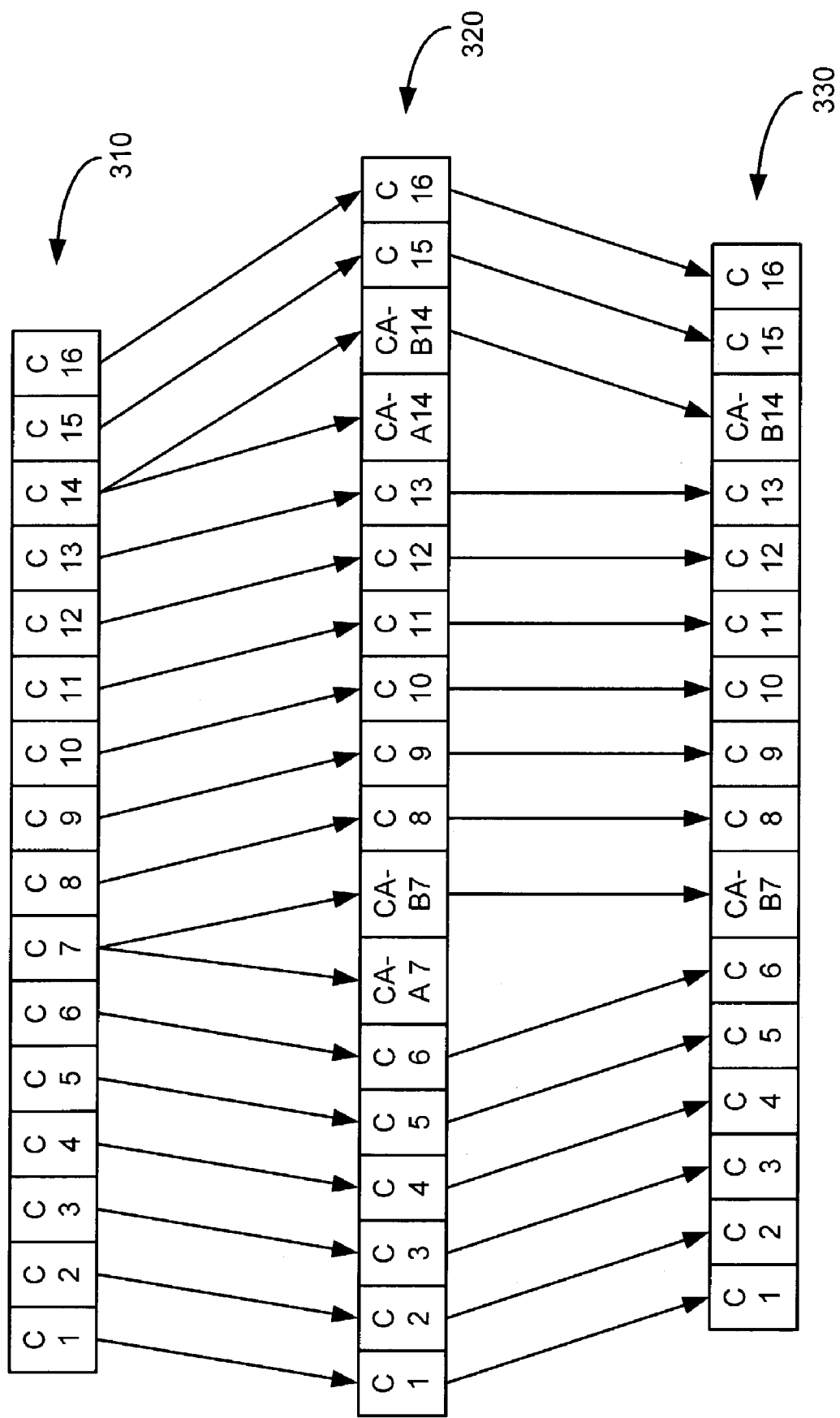
FIG. 3 illustrates conversion from clear content to dual selectively encrypted content to single selectively encrypted content in a manner consistent with certain embodiments of the present invention.

The data streams or files representing the VOD content associated with this process are depicted in FIG. 3. The clear content is represented by packets or other segments of data containing a "C" while encrypted segments encrypted under CA encryption system A is represented by the designations "CA-A". Encrypted segments encrypted under CA encryption system B is represented by designations "CA-B". The initial file is either unencrypted or decrypted and its initial 16 segments is shown as 310. In order to produce the multiply selectively encrypted file, in this case dual selectively encrypted, segments 7 and 14 are selected for encryption. These segments may correspond to important or critical data needed for decoding or may be selected according to any desired selection criteria. These segments are duplicated, encrypted under CA-A and CA-B and reinserted into the file or data stream as shown to produce the dual selectively encrypted file. This file 320 can then be stored for later retrieval, when a customer places an order for this VOD content, on one or more of the VOD servers at the cable hubs or at the cable head end. Once an order is placed, and the order is associated with a particular type of STB (the target STB or ordering STB) and thus a particular type of CA encryption, the dual selectively encrypted content is converted to single encrypted content for transmission to the ordering STB. This is done by stripping out the unneeded portions that are encrypted under any unused CA systems to produce a data stream such as that depicted in 330. In this case, CA-A encrypted segments are stripped out and CA-B encrypted segments remain.

Thus, by use of this technique the storage requirements of the VOD file servers are minimized by not requiring full multiple copies of encrypted content to be stored thereon. Still, the content is stored in a secure manner with low overhead needed to accommodate the multiple encryption schemes. The content, when sent to the ordering STB is further optimized to eliminate the small amount of overhead used for the second CA encryption scheme to further enhance the efficiency of the utilization of the bandwidth for transmission of the VOD content to the ordering STB. Since the VOD system knows which set-top box, legacy or non-legacy, it is sending content to, the content does not need to be sent with packet duplication. This can preserve bandwidth on the cable plant. While the elimination of the unneeded packet is not strictly required, it provides the advantage of minimizing bandwidth and can eliminate the need for a "shadow" or secondary PID to be called out in the Program Map Table (PMT) as described in the above-referenced patent applications, since the encrypted packet can be mapped to the primary PID associated with the unencrypted content.

Figure 4:
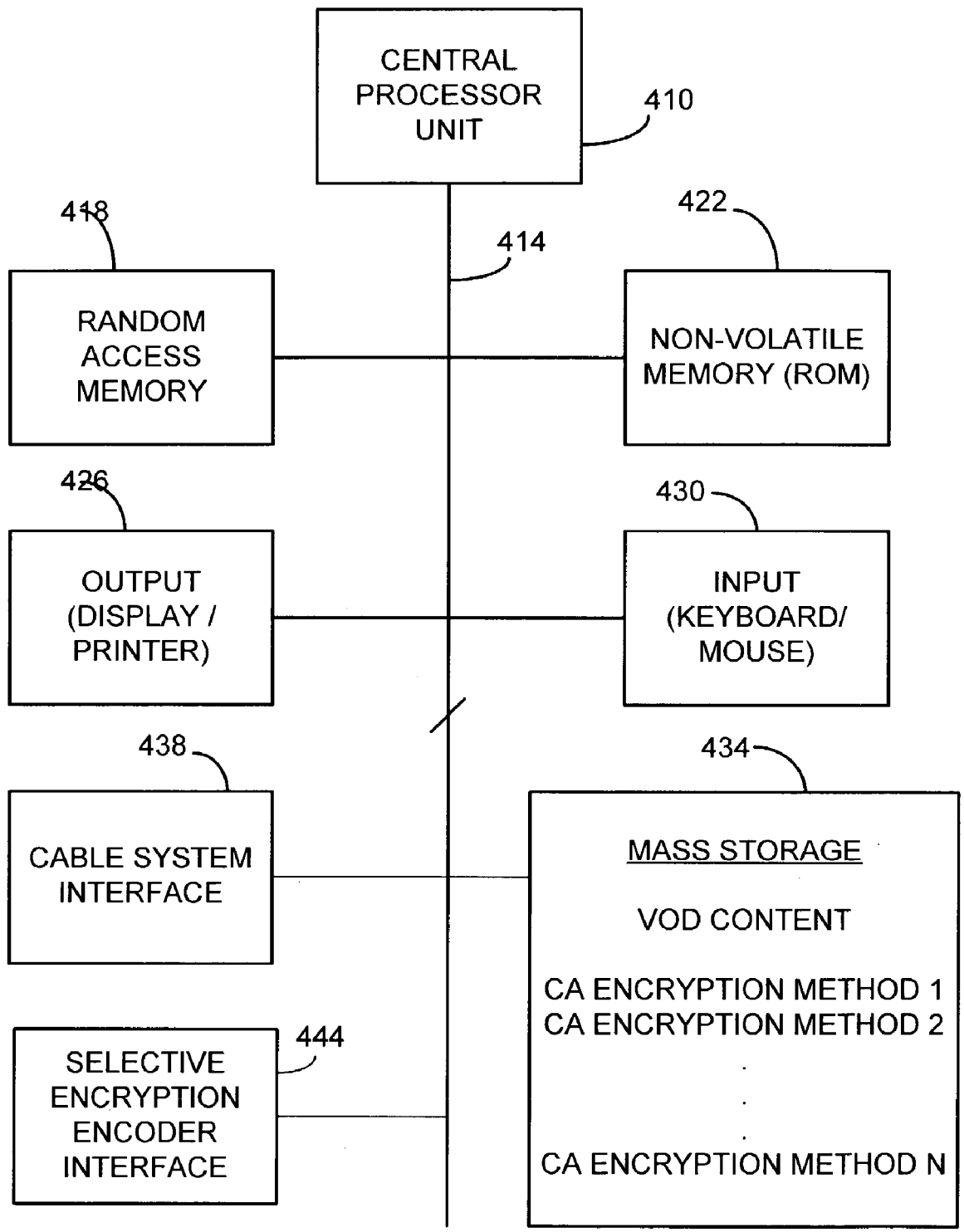
FIG. 4 is a block diagram of an exemplary video on demand server consistent with certain embodiments of the present invention.

The process 200 of FIG. 2 can be carried out on any suitable programmed general purpose processor operating as a VOD server/encoder such as that depicted as computer 400 of FIG. 4. Computer 400 has one or more central processor units (CPU) 410 with one or more associated buses 414 used to connect the central processor unit 410 to Random Access Memory 418 and Non-Volatile Memory 422 in a known manner. Output devices 426, such as a display and printer, are provided in order to display and/or print output for the use of the MSO as well as to provide a user interface such as a Graphical User Interface (GUI). Similarly, input devices such as keyboard, mouse and removable media readers 430 may be provided for the input of information by the operator. Computer 400 also incorporates internal and/or external attached disc or other mass storage 434 (e.g., disc and/or optical storage) for storing large amounts of information including, but not limited to, the operating system, multiple CA encryption methods (if encryption is carried out by the VOD server), as well as the VOD content (which is most likely stored on massive attached storage). The Computer system 400 also has an interface 438 for connection to the cable system to service customer requests for content, and may also have interface 444 that interfaces to multiple encryption devices if the encryption is carried out by separate hardware. While depicted as a single computer, the digital content provider may utilize multiple linked computers to carry out the functions described herein.

In one embodiment of an electronic storage medium storing selectively encrypted video on demand (VOD) programming consistent with embodiments of the invention, stores a file representing multiple selective encrypted VOD content having: segments of unencrypted VOD content; first encrypted segments of VOD content encrypted using a first encryption method associated with a first conditional access system; second encrypted segments of VOD content encrypted using a second encryption method associated with a second conditional access system; the first and second encrypted segments of VOD content representing the same segment of VOD content when not encrypted. A first segment of code, when executed operates to remove one of the first and second encrypted segments of VOD content from the multiple selective encrypted VOD content to produce single selectively encrypted content for transmission to a target decoder. The first segment of code operates to remove one of the first and second encrypted segments of VOD content upon receipt of an order for the VOD content specifying delivery to a target decoder, and upon determining which CA encryption system is associated with the order. The second segment of code sends the single selectively encrypted VOD content to the target decoder. A third segment of code associates a program identifier with the single selectively encrypted VOD content, wherein the same PIDs are used for encrypted and unencrypted segments of content.

Those skilled in the art will recognize that the present invention has been described in terms of exemplary embodiments based upon use of a programmed processor (e.g., computer 400). However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention. Moreover, although the present invention has been described in terms of a general purpose personal computer providing a playback mechanism, the playback can be carried on a dedicated machine without departing from the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above form that can be stored on any suitable electronic storage medium or transmitted over any suitable electronic communication medium or otherwise be present in any computer readable or propagation medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Software code and/or data embodying certain aspects of the present invention may be present in any computer readable medium, transmission medium, storage medium or propagation medium including, but not limited to, electronic storage devices such as those described above, as well as carrier waves, electronic signals, data structures (e.g., trees, linked lists, tables, packets, frames, etc.) optical signals, propagated signals, broadcast signals, transmission media (e.g., circuit connection, cable, twisted pair, fiber optic cables, waveguides, antennas, etc.) and other media that stores, carries or passes the code and/or data. Such media may either store the software code and/or data or serve to transport the code and/or data from one location to another. In the present exemplary embodiments, MPEG compliant packets, slices, tables and other data structures are used, but this should not be considered limiting since other data structures can similarly be used without departing from the present invention.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A video on demand (VOD) method, comprising:
   storing multiple selective encrypted VOD content on a VOD server;
   wherein the multiple selective encrypted VOD content comprises a single instance of digital data representing a VOD program in which selected portions of the digital data representing the VOD program are duplicated to produce first and second duplicate copies of the selected portions of the digital data, and wherein the first duplicate copy of the selected portions of the digital data are encrypted under a first Conditional Access (CA) encryption system and the second duplicate copy of the selected portions of the digital data are encrypted under a second CA encryption system, and wherein portions of the digital data representing the VOD program which are unselected remain unencrypted, so that decryption of either one of the first and second duplicate copies of the digital data and combining the decrypted copy of the selected portions of the digital data representing the VOD program with the unselected portions of the digital data representing the VOD program recreates the single instance of digital data representing the VOD program;

receiving an order for the VOD content specifying delivery to a target decoder;

determining what CA encryption system is associated with target decoder of the order;

stripping all encrypted segments from the multiple selectively encrypted content that are not associated with the CA encryption system associated with the target decoder of the order to produce single selectively encrypted VOD content, wherein single selectively encrypted VOD content comprises digital data representing the VOD program in which only a single one of the first and second CA encrypted duplicate data remains for the encrypted selected portions; and sending the single selectively encrypted VOD content to the target decoder.

2. The method according to claim 1, further comprising:
examining unencrypted data representing digital content to identify segments of content for encryption;
encrypting the identified segments of content using a first encryption method associated with a first conditional access system to produce first encrypted segments;
encrypting the identified segments of content using a second encryption method associated with a second conditional access system to produce second encrypted segments; and
replacing the identified segments of content with the first encrypted content and the second encrypted content in the digital content to produce the multiple selectively encrypted VOD content.

3. The method according to claim 1, further comprising associating a packet identifier (PID) with the single selectively encrypted VOD content, wherein the same PIDs are used for encrypted and unencrypted segments of content.

4. The method according to claim 1, wherein the decoder comprises a television Set-top box.

5. The method according to claim 1, wherein the VOD server resides at a cable hub.

6. A computer readable medium storing instructions which, when executed on a programmed processor, carry out the VOD method according to claim 1.

7. An electronic transmission medium carrying single selectively encrypted VOD content created by the method according to claim 1.

8. A video on demand (VOD) method, comprising:
examining unencrypted digital data representing a single instance of digital content to identify segments of data for encryption;
encrypting the identified segments of data forming a part of the content using a first encryption method associated with a first conditional access system to produce first encrypted data segments; encrypting a duplicate of the identified segments of data using a second encryption method associated with a second conditional access system to produce second encrypted data segments;
replacing the identified segments of data with the first encrypted data segments and the second encrypted data segments in the digital content, to produce the multiple selectively encrypted VOD content;
storing the multiple selective encrypted VOD content on a VOD server residing at a cable hub;
receiving an order for the VOD content specifying delivery to a target decoder;
determining what CA encryption system is associated with the order;
stripping all encrypted data segments from the multiple selectively encrypted content that are not encrypted using the CA encryption system associated with the order to produce single selectively encrypted VOD content;
associating a packet identifier (PID) with the single selectively encrypted VOD content, wherein the same PIDs are used for encrypted and unencrypted segments of content; and
sending the single selectively encrypted VOD content to the target decoder.

9. A video on demand (VOD) encoder, comprising:
a programmed processor that examines unencrypted data representing digital content to identify segments of data representing portions of the digital content for encryption;
a first encrypter that encrypts the identified segments of data representing portions of the digital content using a first encryption method associated with a first conditional access system to produce first encrypted segments;
a second encrypter that encrypts a duplicate of the data representing the identified segments of data representing portions of the digital content using a second encryption method associated with a second conditional access system to produce second encrypted segments;
wherein the programmed processor further receives the first and second encrypted segments and replaces the identified segments of data representing the digital content with the first encrypted segments and the second encrypted segments in the digital content, to produce the multiple selectively encrypted VOD content;
means for storing the multiple selective encrypted VOD content;
means for receiving an order for the VOD content specifying delivery to a target decoder;
means for determining what CA encryption system is associated with the order; and
wherein the programmed processor strips all encrypted segments from the multiple selectively encrypted content that are not associated with the CA encryption system associated with the order to produce single selectively encrypted VOD content.

10. The encoder according to claim 9, wherein the programmed processor further associates a packet identifier (PID) with the single selectively encrypted VOD content, wherein the same PIDs are used for encrypted and unencrypted segments of content, and sends the single selectively encrypted VOD content to the target decoder.

11. A selectively encrypted video on demand (VOD) system, comprising:
- a VOD server storing multiple selective encrypted VOD content;
- wherein the multiple selective encrypted VOD content comprises a single instance of digital data representing a VOD program in which selected portions of the digital data representing the VOD program are duplicated to produce first and second duplicate copies of the selected portions of the digital data, and wherein the first duplicate copy of the selected portions of the digital data are encrypted under a first Conditional Access (CA) encryption system and the second duplicate copy of the selected portions of the digital data are encrypted under a second CA encryption system, and wherein portions of the digital data representing the VOD program which are unselected remain unencrypted, so that decryption of either one of the first and second duplicate copies of the digital data and combining the decrypted copy of the selected portions of the digital data representing the VOD program with the unselected portions of the digital data representing the VOD program recreates the single instance of digital data representing the VOD program;
- program means running on a programmed processor for receiving an order for the VOD content specifying delivery to a target decoder, and for determining a CA encryption system associated with the order;
- wherein, in response to the order, the VOD server strips all encrypted segments from the multiple selectively encrypted content that are not associated with the CA encryption system of the target decoder of the order to produce single selectively encrypted VOD content;
- a target decoder addressable by the VOD server, wherein single selectively encrypted VOD content comprises digital data representing the VOD program in which only a single one of the first and second CA encrypted duplicate data remains for the encrypted selected portions; and
- means for sending the single selectively encrypted VOD content from the VOD server to the target decoder.

12. The system according to claim 11, wherein:
- the VOD server carries out a programmed process that examines unencrypted data representing digital content to identify segments of content for encryption;
and further comprising:
- a first encrypter that encrypts the identified segments of content using a first encryption method associated with a first conditional access system to produce first encrypted segments;
- a second encrypter that encrypts the identified segments of content using a second encryption method associated with a second conditional access system to produce second encrypted segments; and
- wherein the VOD server replaces the identified segments of content with the first encrypted content and the second encrypted content in the digital content, to produce the multiple selectively encrypted VOD content.

13. The system according to claim 12, wherein the VOD server further associates a packet identifier (PID) with the single selectively encrypted VOD content, wherein the same PIDs are used for encrypted and unencrypted segments of content.

14. The system according to claim 11, wherein the decoder comprises a television Set-top box.

15. The system according to claim 11, wherein the VOD server resides at a cable hub.

16. The system according to claim 11, wherein the VOD server resides at a cable system head end.

17. An electronic storage medium storing selectively encrypted video on demand (VOD) programming, comprising:
- a file representing a single instance of digital multiple selective encrypted VOD content comprising:
  - segments of data representing unencrypted VOD content;
  - first encrypted segments of data representing VOD content encrypted using a first encryption method associated with a first conditional access system;
  - second encrypted segments of data representing VOD content encrypted using a second encryption method associated with a second conditional access system;
  - the first and second encrypted segments of data representing VOD content representing the same segment of data when not encrypted;
- a first segment of code that when executed operates to remove one of the first and second encrypted segments of data representing VOD content from the multiple selective encrypted VOD content to produce single selectively encrypted content for transmission to a target decoder.

18. The electronic storage medium according to claim 17, wherein the first segment of code operates to remove one of the first and second encrypted segments of VOD content upon receipt of an order for the VOD content specifying delivery to a target decoder, and upon determining which CA encryption system is associated with the order.

19. The electronic storage medium according to claim 17, further comprising a second segment of code that sends the single selectively encrypted VOD content to the target decoder.

20. The electronic storage medium according to claim 17, further comprising a third segment of code that associates a packet identifier (PID) with the single selectively encrypted VOD content, wherein the same PIDs are used for encrypted and unencrypted segments of content.

* * * * *

UNITED STATES PATENT AND TRADEMARK OFFICE
CERTIFICATE OF CORRECTION

PATENT NO. : 7,039,938 B2 Page 1 of 1
APPLICATION NO. : 10/319133
DATED : May 2, 2006
INVENTOR(S) : Candelore It is certified that error appears in the above-identified patent and that said Letters Patent is hereby corrected as shown below:

In col. 4, line 23, delete "sousing" and insert -- so using -- therefor.

In col. 2, line 23, delete "program" and insert -- packet -- therefor.

In col. 5, line 10, after "HITS" insert -- (Headend In The Sky) -- therefor.

In col. 5, line 28, delete "a multiple" and insert -- multiple -- therefor.

In col. 5, line 38, after "head end", insert -- at 210 -- therefor.

In col. 5, line 39, after "PCR", insert -- (Program Clock Reference time stamps) -- therefor.

In col. 6, line 29, delete "segments is" and insert -- segmenst are -- therefor.

In col. 7, line 31, delete "embodiment of" and insert -- embodiment -- therefor.

In col. 7, line 54, delete "program" and insert -- packet -- therefor.

Signed and Sealed this

First Day of August, 2006

JON W. DUDAS
*Director of the United States Patent and Trademark Office*